United States Patent
Chauhan et al.

(10) Patent No.: US 11,129,026 B1
(45) Date of Patent: Sep. 21, 2021

(54) ESIM SWITCHING PLATFORM

(71) Applicant: T-Mobile USA, Inc., Bellevue, WA (US)

(72) Inventors: Kanakrai Chauhan, Snoqualmie, WA (US); Kirby Thornton, Carnation, WA (US); Abigail Franco, Bellevue, WA (US); Sarvesh Kaushal, Everett, WA (US); Rohit Iyer, Bellevue, WA (US); Michael Mitchell, North Bend, WA (US); Hamza Syed, Bothell, WA (US); Sheetal Guttigoli, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/849,466

(22) Filed: Apr. 15, 2020

(51) Int. Cl.
*H04W 12/72* (2021.01)
*H04W 4/50* (2018.01)
*H04W 36/14* (2009.01)
*H04W 52/14* (2009.01)
*H04W 4/33* (2018.01)
*H04W 52/04* (2009.01)
*H04W 52/02* (2009.01)
*H04W 52/24* (2009.01)
*H04B 7/26* (2006.01)
*H04W 12/06* (2021.01)

(52) U.S. Cl.
CPC .......... *H04W 12/72* (2021.01); *H04B 7/2606* (2013.01); *H04W 4/33* (2018.02); *H04W 4/50* (2018.02); *H04W 12/068* (2021.01); *H04W 36/14* (2013.01); *H04W 52/0206* (2013.01); *H04W 52/0245* (2013.01); *H04W 52/04* (2013.01); *H04W 52/143* (2013.01); *H04W 52/241* (2013.01)

(58) Field of Classification Search
CPC .......... H04W 12/00514; H04W 12/08; H04W 12/0608; H04W 36/14; H04W 4/50; H04L 63/0853; H04B 1/3816
See application file for complete search history.

(56) References Cited

U.S. PATENT DOCUMENTS

2012/0244837 A1* 9/2012 Fyke ..................... H04W 8/06
455/411
2014/0365304 A1* 12/2014 Showers ............... G01S 5/0252
705/14.55

(Continued)

*Primary Examiner* — Fred A Casca
(74) *Attorney, Agent, or Firm* — Han Santos, PLLC (57) ABSTRACT

The techniques provide a wireless communication carrier with the ability to efficiently add a device that is currently provisioned for a different carrier. Identification information is received for a mobile device to be switched from a first mobile network operator to a second mobile network operator. From a user interface executing on the mobile device, authorization is received to switch the mobile device. A token is generated that is usable to access unique identification data for an embedded Universal Integrated Circuit Card (eUICC) installed on the mobile device. Based in part on the tokens, subscription credentials are generated for accessing a mobile communications network operated by the second mobile network operator. Using the subscription credentials, the mobile device is provisioned to communicate on the mobile communications network operated by the second mobile network operator without further user input.

20 Claims, 5 Drawing Sheets

(56) References Cited

U.S. PATENT DOCUMENTS

| | | | |
|---|---|---|---|
| 2016/0142855 A1* | 5/2016 | Yu | H04W 4/70 |
| | | | 455/419 |
| 2018/0131699 A1* | 5/2018 | Park | H04W 8/205 |
| 2019/0050178 A1* | 2/2019 | Kook | H04L 63/083 |
| 2019/0158658 A1* | 5/2019 | Gebers | H04L 67/306 |
| 2019/0188588 A1* | 6/2019 | Yang | G06F 16/9535 |
| 2019/0279172 A1* | 9/2019 | Duffield | G06Q 20/02 |
| 2020/0260354 A1* | 8/2020 | Ma | H04W 8/245 |

\* cited by examiner

ESIM SWITCHING PLATFORM

BACKGROUND

Service providers for communications devices generally require that a communications device has the proper credentials to access and enable use of services. The credentials securely and uniquely identify a subscription or account with the service provider and enable the communications device to access and use the services associated with the subscription. When the communications device is a mobile communications device, the service provider may be called a mobile network operator (MNO), and the services may include, for example, mobile voice calling, text messaging, or internet data service.

Many communications devices use Embedded Universal Integrated Circuit Cards (eUICCs), also referred to as Embedded Subscriber Identity Modules (eSIMs). Unlike a traditional UICC or SIM card that exists as a removable smart card that is transferrable between multiple devices, an eUICC is an integrated circuit that is not designed to be user removable, i.e., it is generally embedded within or soldered to other electronic components of a device.

An eUICC may be provisioned with one or more eSIM profiles, in which each eSIM profile contains a unique international mobile subscriber identity (IMSI) number that authenticates a subscriber to a wireless communication carrier. Other data that are stored in the eSIM profile may include carrier network information, security authentication information, a list of accessible network services, and/or so forth. The wireless communication carrier may use a subscription management service to manage and transfer eSIM profiles.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

The invention provides a way to seamlessly switch a user's mobile device (herein also referred to as a prospective subscriber device) from one carrier to another carrier using data from their eSIM. Currently this is a time-intensive and laborious process that can be a barrier for customers who wish to switch from their current carrier to a desired carrier (herein also referred to as a prospective carrier). Typically, a user must manually enter information on a multiple page form and spend hours attempting to facilitate the process with representatives from the carrier. Various embodiments are disclosed herein for automating the carrier switching process while minimizing user interaction and user time.

In one embodiment, a token is sent from a carrier token service to the prospective subscriber device. The token authorizes the prospective carrier to communicate with the prospective subscriber device and obtain the device's eSIM information. The token is needed because mobile devices may be restricted from allowing applications or services to directly access an embedded eUICC ID (EID) or otherwise access this information from other sources. The token may allow, for example, the EID information to be obtained from a subscription manager such as the SMDP+. The token, which in some embodiments may be referred to as a device authentication token (DAT), may further be configured to cause a prompt to appear on a user interface (UI) of the prospective subscriber device that requests authorization from the user to switch carriers. In response to receiving authorization from the user, the token and associated token service may obtain eSIM data of the prospective device, such as the Mobile Station International Subscriber Directory Number (MSISDN), International Mobile Equipment Identity (IMEI), and EID, without requiring additional user interaction. The captured data may be used to provision the prospective subscriber device to switch to the new carrier. In addition to the MSISDN, IMEI and EID, other data may be captured from the device that may be used to facilitate the transfer to the new carrier, as well as to identify and recommend services and subscriptions to the user of the prospective subscriber device. Such data may include the device model, subscriber name, service address, phone number, and other information gleaned from one or more device profiles or provided manually via a UI of the prospective device.

In some embodiments, the captured data may be used to determine a risk profile for the device owner. A risk profile may be determined based on factors such as the subscriber history, location, and usage profile. More generally, the captured data may be used to identify and recommend subscriptions and other products for the user, such as a data plan, voice plan, and other features. Captured data that may be analyzed to generate recommendations may include, for example, call history, application usage, travel history, data usage, payment history, stored location information such as GPS data, and other factors. Based on an analysis of the data, predictions may be determined for products and services that may be suitable for the prospective device and user.

In addition to data on the device, additional data may be accessed from the current carrier that is associated with the prospective subscriber device. In some embodiments, the user may be prompted to enter credentials such as a PIN for the user account at the current carrier. Once authenticated at the current carrier, additional user profile and usage data may be accessed.

In an embodiment, one or more functions associated with the disclosed features may be implemented in an application that may be downloaded to the prospective subscriber device. The downloaded application may facilitate the various functions needed to transfer the prospective subscriber device from the current carrier to the new carrier. In scenarios where a user would like to transfer multiple devices that are on the same plan or account, the application may be downloaded to each device that shares the plan or account. The application may then facilitate, using the disclosed techniques, the transfer from the prospective subscriber devices(s) to the new carrier. Typically, each line on a shared account is considered a separate account and each device and device user must separately go through the same transfer process. If a particular user, such as a family member, is not present during the transfer process, the prospective carrier may not be able to facilitate the transfer. By using the downloaded application as disclosed herein, each user may download and run the application on their respective devices, which may then initiate and facilitate the transfer without the need for each user to be physically present at the carrier. As used herein, the downloaded application may be referred to as a transfer application or carrier switching application.

In some embodiments, techniques are provided for predictive plan provisioning where usage history and call history are captured over a predetermined time interval. The data may be analyzed, and a plan may be predicted that is rate-fit based on the captured data usage and call history.

In an embodiment, the transfer application may obtain one or more permissions from the user. The transfer application may obtain permissions to access dialer data, application usage data, and other user data. When the transfer application obtains the necessary permissions, the transfer application may be configured to access the user data without the need for proprietary permissions.

In an embodiment, when the required permissions are provided, a request can be sent to a backend server and the prospective carrier can access or receive device identity information such as the IMEI or EICCID. If the prospective device has an eSIM device, then the provisioning information can be directly processed.

In an embodiment, the new carrier may use the device identifier and data from the current carrier to determine if the device is locked, paid off, or verify that the device has not been reported as stolen. If the user provides authorization to access data from other accounts associated with the user, then the new carrier may obtain other information that may be used to generate recommendations. Additionally, the advertising profile of the device may be accessed by the prospective carrier to identify and recommend services.

In one embodiment, an eSIM management platform may be implemented that may initiate a carrier switchover in response to requests from users. The eSIM management platform may be a backend service of a wireless communication carrier that serves as an interface between various entities and subscription management services. The eSIM management platform may be configured to enable the entities to manage the deployment of eSIM profiles into eUICCs of prospective devices. For example, the eSIM management platform may receive a request from an entity to perform a profile management task, such as provisioning an eUICC of a prospective user device with an eSIM profile. In turn, the eSIM management platform may relay the request to a subscription management service that is responsible for managing the affected eSIM profile. Thus, the subscription management service may be used by an entity to perform eSIM profile management. In various embodiments, the subscription management service may be configured to manage eSIM profiles provisioned to the eUICCs of machine-to-machine (M2M) devices and consumer devices that receive telecommunication services from the entity.

In various embodiments, the eSIM management platform may receive a profile change request from an entity. The profile change request may request a change for a single eSIM profile, or for multiple eSIM profiles. In turn, the eSIM management platform may validate each profile state change in the profile change request to ensure that each requested profile state change is an authorized operation. Validation of a profile state change may include receiving permission from the owner of an eSIM profile to change or add an eSIM profile. Assuming that each requested profile state change in the profile change request is validated, the eSIM management platform may send the profile change request to the subscription management service. In some embodiments, the eSIM management platform may send a profile change request to the subscription management service by calling an application program interface (API) of the subscription management service.

In turn, the subscription management service may perform one or more profile state changes included in the profile change request. In some embodiments, the subscription management service may be configured to perform multiple validations prior to performing the profile state change for an eSIM profile.

Following the processing of a profile change request, the subscription management service may provide a profile change notification to the eSIM management platform. The profile change notification may indicate the success or failure of each profile change requested in the profile change request.

The disclosed embodiments may provide a wireless communication carrier with the ability to directly initiate a subscription management service to perform profile changes. This ability may enable the wireless communication carrier to quickly and efficiently transition a user's carrier without the time consuming and manual procedures of current processes. Accordingly, the ability to directly initiate a subscription management service to perform profile changes may significantly reduce transition time, increase subscriber satisfaction with the wireless communication carrier, and remove barriers to new subscribers for the carrier. The techniques described herein may be implemented in a number of ways. Example implementations are provided below with reference to the following FIGS. 1-5.

The techniques described herein may be implemented for devices in communication with various wireless communications systems such as CDMA, TDMA, FDMA, OFDMA, and SC-FDMA. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

Example Architecture

Figure 1:
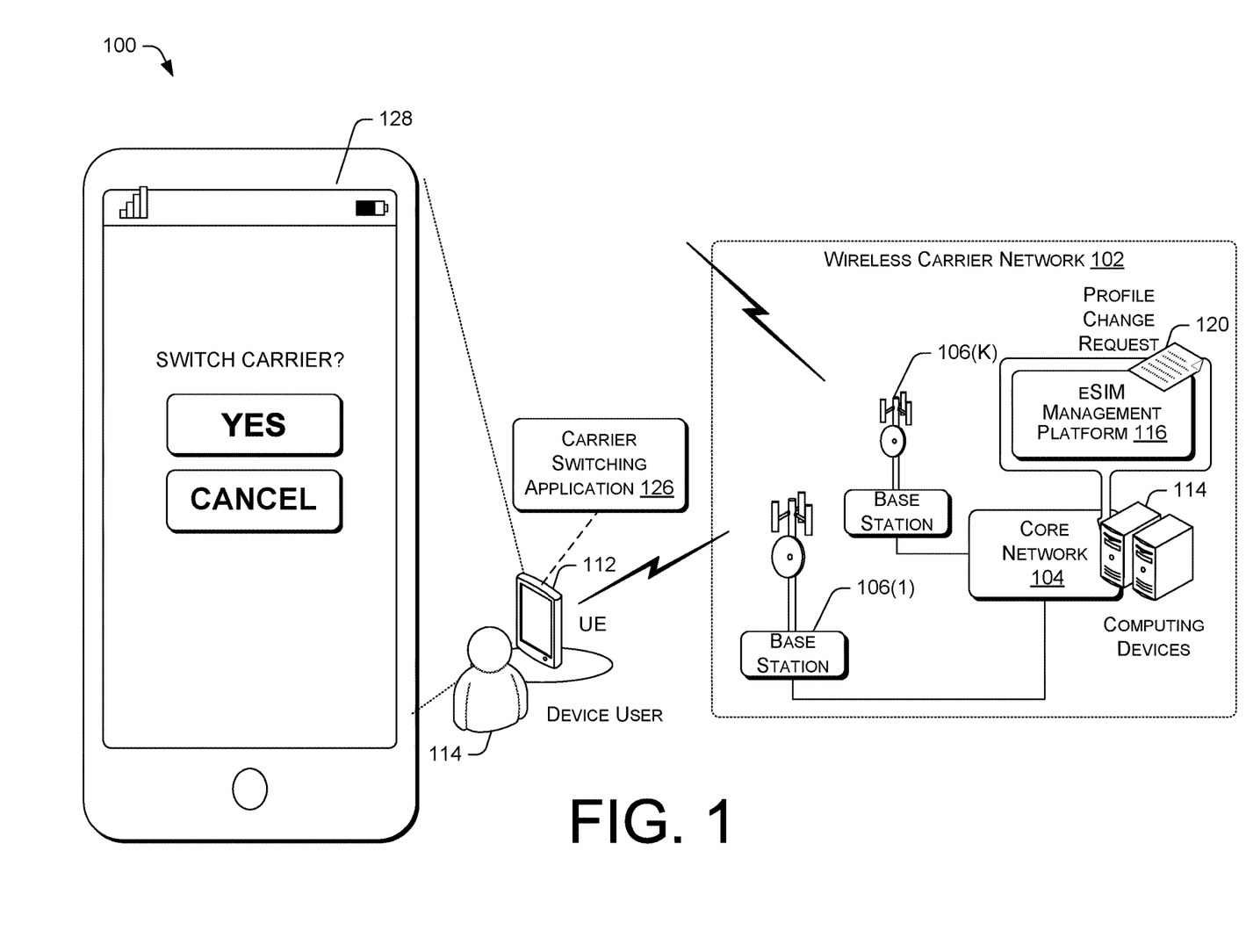
FIG. 1 illustrates an example architecture that enables switching a device from a first carrier to a second carrier.

FIG. 1 illustrates an example wireless carrier network architecture 100 that implements carrier switching. The wireless carrier network 102 may include a core network 104 and a radio access network. The wireless communication carrier 102 may provide a wide range of mobile communication services, as well as ancillary services and features, to subscribers and associated mobile device users. The wireless communication carrier 102 may also be referred to as a mobile network operator (MNO). In various embodiments, the wireless communication carrier 102 may provide wireless communication between multiple user devices. Further, the wireless communication carrier 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless communication carrier 102 may be implemented using multiple interconnected networks. In various embodiments, the wireless communication carrier 102 may include multiple Radio Access Networks (RANs). The RANs may be connected to each other via regional ground networks. In turn, the regional ground networks may be connected to a core network by a wide area network (WAN). Each regional portion of the wireless communication carrier 102 may include one or more RANs and a regional circuit and/or packet switched network and associated signaling network facilities. The wireless communication carrier 102 may provide telecommunication services in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), 5th Generation (5G), and/or so forth. In some embodiments, the core network of the wireless communication carrier 102 may be accessed via wired or wireless local area networks (LANs). For example, a wireless local area network may be a network that is established using Wi-Fi or Bluetooth standards and hardware.

A radio access network (RAN) of the wireless communication carrier 102 may include a number of base stations, also referred as network cells. In some embodiments, the base stations may be in the form of nodes. Each node may include a base transceiver system (BTS) that communicates via an antennae system over an air-link with one or more user devices that are within range. The BTS may send radio communication signals to user devices and receive radio communication signals from user devices. The RANs may carry the communications of the user devices between the respective base stations and a core network of the wireless communication carrier 102. The core network may connect to a public packet data communication network, such as the Internet. Data and voice communications via the RANs, the core network, and the Internet may support a variety of telecommunication services through the wireless communication carrier 102.

The RAN may include multiple base stations, such as base stations 106(1)-106(K). Each of the base stations 106(1)-106(K) may provide a corresponding network cell that delivers telecommunication and data communication coverage. The core network 104 may use the network cells to provide wireless communication services to user devices. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as communication with backend servers in the core network 104.

In various embodiments, 2G and/or 3G network components of the wireless communication carrier 102 may include a Serving GPRS Support Node (SGSN) that routes voice calls to and from the public switched telephone network (PSTN), a Gateway GPRS Support Node (GGSN) that handles the routing of data communication between external packet switched networks and the core network. The network components may further include a Packet Data Network (PDN) Gateway (PGW) that routes data traffic between the GGSN and the Internet. The LTE components of the wireless communication carrier 102 may include an Evolved Packet Core (EPC) and an IP Multimedia Subsystem (IMS) core.

Accordingly, the base stations 106(1)-106(K) are responsible for handling voice and data traffic between user devices and the core network 104, such as a user device (UE) 112 of a call recipient 114. In various instances, the user devices may include smartphones, tablet computers, and/or other wireless communication devices that can be used to make and receive voice telephone calls or send and receive communications messages.

The wireless communication carrier 102 may provide telecommunication services to multiple user devices, which may include consumer devices and M2M devices. Consumer devices are network-capable device that are generally marketed to individual consumers and are capable of obtain telecommunication and/or data communication services from the wireless communication carrier 102. For example, these devices may include a smartphone, a tablet computer, a smartwatch, a gaming console. M2M devices are networked machines that use the telecommunication services provided by the wireless carrier to communicate with other devices. Each of the user devices may be equipped with an eUICC, i.e., an integrated circuit chip that is directly wired or soldered to a circuit board of the user device. The eUICC may store one or more eSIM profiles, which may include information for accessing telecommunication services provided by a corresponding wireless communication carrier, such as the wireless communication carrier 102. Each user device may be further equipped with a modem that enables the user device to perform telecommunication and data communication with the wireless communication carrier 102. Accordingly, the modem may encode digital information for transmission in uplink radio signals to the wireless communication carrier 102, as well as decode digital information that is received from the wireless communication carrier 102 via downlink radio signals.

A carrier switching application 126 on the UE 112 may present a carrier switching notification interface 128 that prompts a device user 114 to authorize a change to a new carrier. For example, the interface may include text and/or graphics that corresponds to the prompt.

Figure 2:
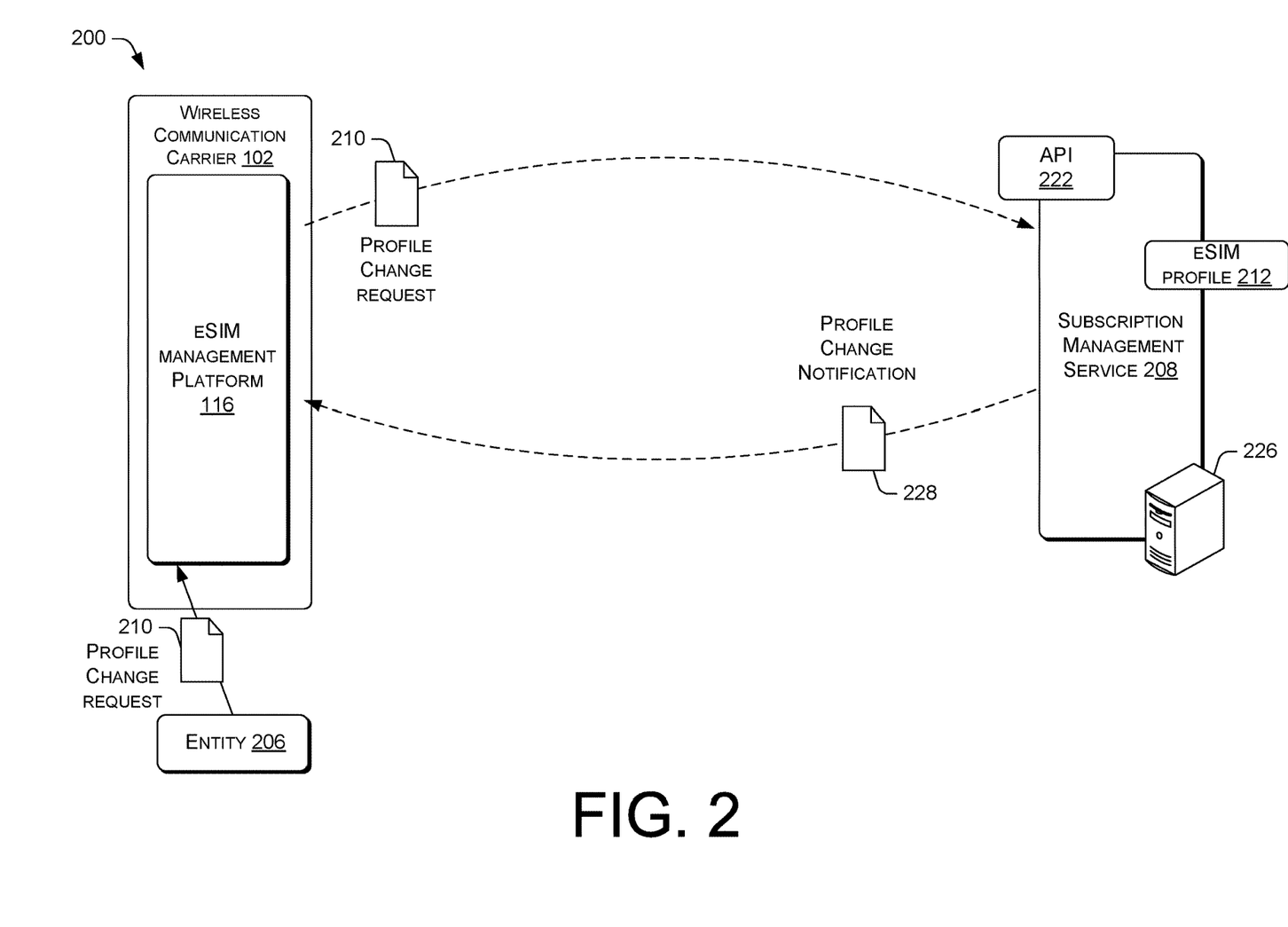
FIG. 2 is an example architecture that enables switching a device from a first carrier to a second carrier.

FIG. 2 illustrates an example architecture 200 that enables an eSIM management platform to initiate a subscription management service to switch eSIM profiles. The backend servers of the wireless communication carrier 102 may provide an eSIM management platform 116. The eSIM management platform 116 may serve as a central interface between entities, such as the entity 106, and a subscription management service 208. The entities may be a third-party partner of the wireless communication carrier, a M2M device vendor, a M2M device operator, and/or so forth. A third-party partner of the wireless communication carrier 102 may be a provider that provides content or services to the subscribers of the carrier. However, in other instances, an entity may be a network aggregator or a hub. A network aggregator or a hub is a telecommunication service provider that consolidates carrier services provided by multiple wireless communication carriers into a single carrier service for offering to subscribers. In some instances, the wireless communication carrier 102 itself may also be an entity.

In its role as the central interface, the eSIM management platform 116 may receive eSIM profile change requests from one or more entities. Such requests may include a request from an entity to provision an eUICC of a user device with a new eSIM profile, delete an eSIM profile from the eUICC of the user device, or activate an eSIM profile that is stored in the eUICC of the user device to obtain communication services from a wireless communication carrier. In turn, the eSIM management platform 116 may send the request to a subscription management service 208, for the completion of the request.

The subscription management service 208 may be configured to manage one or more sets of eSIM profiles that are provisioned to eUICCs of user devices. A set of eSIM profiles managed by the subscription management service 208 may belong to one or more entities. In some embodiments, the subscription management service 208 may be provided by multiple subscription manager applications, such as at least one Subscription Manager Data Preparation (SM-DP), at least one Subscription Manager Data Preparation Plus (SM-DP+), and at least one Subscription Manager Secure Routing (SM-SR). The eSIM profiles for M2M devices, also referred to as M2M eSIM profiles, may be loaded into the profile data stores of SM-DPs that implement the subscription management service 208. On the other hand, the eSIM profiles for consumer devices, also referred to as consumer eSIM profiles, may be loaded into profile state stores of a SM-DP+ that implement the subscription management service 208. The subscription management service 208 may further maintain a profile database that tracks the profile states of eSIM profiles, in which the profile state of each eSIM profile may be determined by the deployment and/or usage status of the eSIM profile.

The eSIM management platform 116 may include an application program interface (API) abstraction layer that provides multiple APIs to the various entities, in which the entities may call the APIs to initiate profile management tasks for the eSIM profiles.

In one example, entity 206 may call an API of the eSIM management platform 116 to send a profile change request 210 to the eSIM management platform 104. The profile change request 210 may be for device to switch to a new carrier. Depending on whether the eSIM profile 212 has been deployed, the eSIM profile 212 may be stored in a profile store of the subscription management service 208 or provisioned in an eUICC of a user device. In turn, the eSIM management platform 116 may send the profile change request 210 to the subscription management service 208. The profile change request 210 may include an Integrated Circuit Card ID (ICCID), a current carrier ID, and a target carrier ID. An ICCID identifies the eSIM profile 212 for which the profile state change is requested. In various embodiments, the eSIM management platform 116 may call an API 222 of the subscription management service 208 to transfer the profile change request 210 to the service. In some instances, the API 222 may be a new API that is specifically implemented on the subscription management service 208 to receive profile change requests from the eSIM management platform 116. In other instances, the API 222 may be a modified version of an existing API of the subscription management service 208 that conforms to GSM (Global System for Mobile Communications) Association, or GSMA ES2/ES2+ interface standards. For example, the API may be a Representational State Transfer (REST) API that transfers the profile change request 210 as JavaScript Object Notation (JSON) data.

The subscription management service 208 may send a profile change notification 228 to the eSIM management platform 116 following a processing of the profile change request 210 for the eSIM profile 212. The profile change notification 228 may be a dataset that includes the ICCID and a result. In the event that the profile state change was successful, the result may indicate that the profile state change is complete. However, if the profile state change failed, such as due to a validation failure, the result may indicate the requested profile state change has failed, as well as a reason for the failure or a reason code that represents the reason for failure.

Following the receipt of the profile change notification 228, the eSIM management platform 116 may determine whether the notification indicates that the carrier switch was successful or failed. If the carrier switch was successful, the eSIM management platform 116 may further notify the requesting entity that the profile state of eSIM profile 212 is updated. However, if the carrier switch failed, the eSIM management platform may pass the failure notification to the entity of the failure.

Example Computing Device Components

Figure 3:
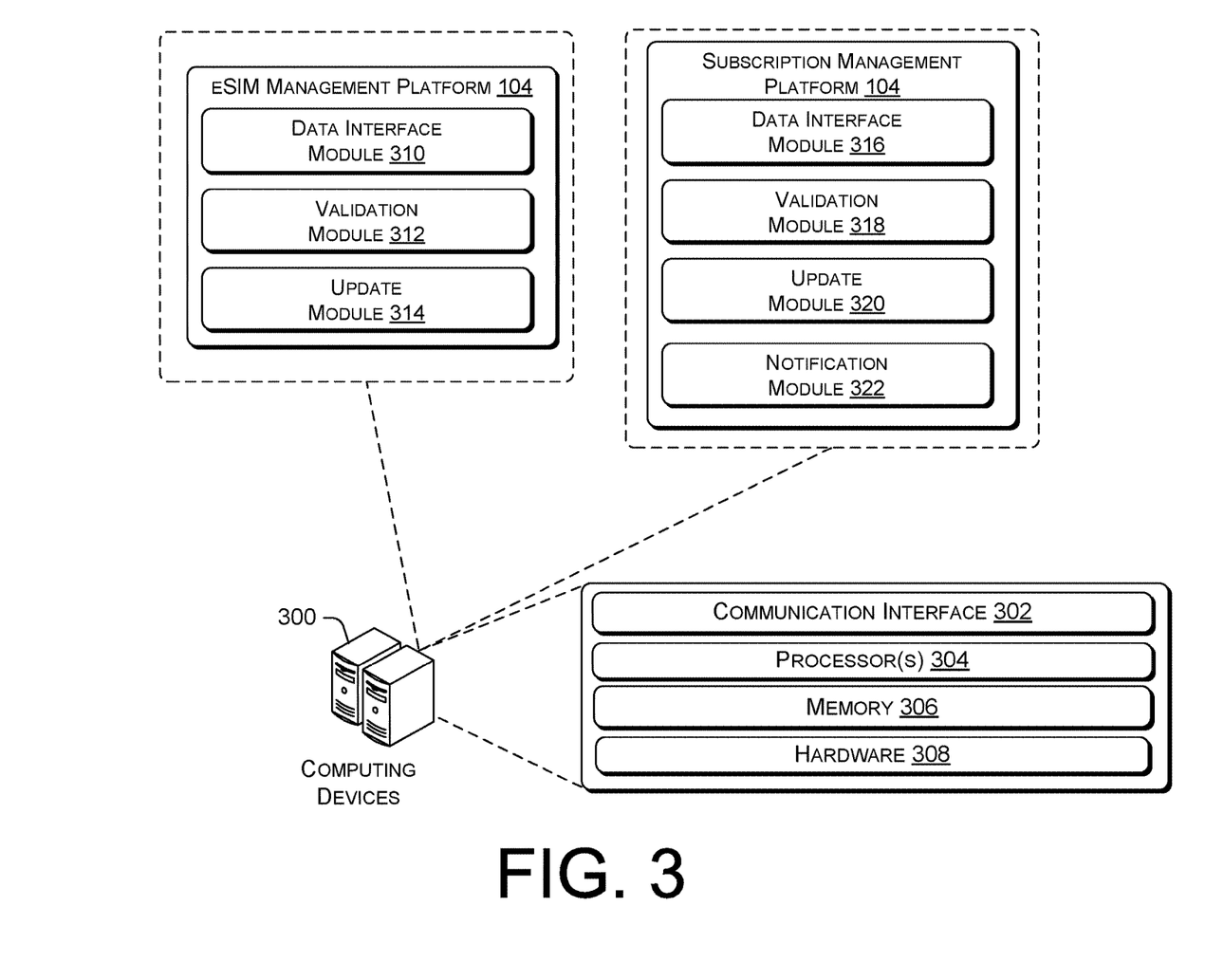
FIG. 3 is a block diagram showing various components of one or more illustrative computing devices of an eSIM management platform that initiates a subscription management service.

FIG. 3 is a block diagram showing various components of one or more illustrative computing devices of an eSIM management platform that initiates a carrier switchover. The computing devices 300 may include a communication interface 302, one or more processors 304, memory 306, and hardware 308. The communication interface 302 may include wireless and/or wired communication components that enable the computing devices 300 to transmit data to and receive data from other networked devices. The hardware 308 may include additional user interfaces, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In other embodiments, the computing devices 300 or components thereof may be virtual computing devices in the form of virtual machines or software containers that are hosted in a computing cloud.

The computing devices 300 may implement various back-end services and components of the wireless communication carrier 102, such as the eSIM management platform 104. The eSIM management platform 116 may include a data interface module 310, a validation module 312, and an update module 314 that facilitates explicitly requesting the subscription management service 208 to perform profile changes. The modules may include routines, code segments, program instructions, objects, and/or data structures that perform particular tasks or implement particular abstract data types.

The data interface module 310 may provide an API that can be called by an entity to receive profile change requests from the entity. The data interface module 310 may further call the API 222 or the API 210 of the subscription management service 208 to transfer the profile change requests to the service. Alternatively, the data interface module 310 may interface with a file transfer mechanism of the subscription management service 208 to send transition requests. Further, the data interface module 310 may receive the profile transition notifications from the subscription management service 208 for transfer to the entities via APIs or the file transfer mechanism.

The validation module 312 may be configured to verify that a profile change request has the necessary permissions and that the change is otherwise allowable based on information pertaining to the user device. Accordingly, the validation module 312 may generate an error indication if a requested change is not allowed. Otherwise, the validation module 312 may permit the profile change request to be sent to the subscription management service 208.

The update module 314 may provide an interface configured to receive inputs from users or entities. In some instances, the interface may be a user interface portal that enables a user to manually input data. In other instances, the interface may be a data upload interface that enables the user to upload a data file. In turn, the update module 314 may store the new or modified data for use by the eSIM management platform 104.

The subscription management service 208 may be implemented by the computing devices 300. In alternatively embodiments, the subscription management service 208 may be implemented by equivalent component devices that are controlled by a third-party service provider. The subscription management service 208 may include a data interface module 316, a state validation module 318, a state update module 320, and a notification module 322. The modules may include routines, code segments, program instructions, objects, and/or data structures that perform particular tasks or implement particular abstract data types.

The data interface module 316 may provide APIs that can be called by the eSIM management platform 116 to receive profile change requests. Further, the data interface module 316 may further include a file transfer mechanism that receives batch profile change requests in the form of data files. In turn, the data interface module 316 may send request acknowledgements and profile transition notifications to the eSIM management platform 104. The validation module 318 may verify that a profile change request has the proper permissions and does not conflict with any policies. Accordingly, the validation module 318 may generate an appropriate error indication if the proper permissions have not been provided or if a disallowed operation is found. The error indication indicator may further include one or more reasons or reason codes for the failure. Otherwise, the validation module 318 may permit the update module 320 to perform the profile state change requested.

The update module 320 may update the profile state of an eSIM profile if the validation module 318 has deemed that the profile change request is allowable.

Example Processes

Figure 4:
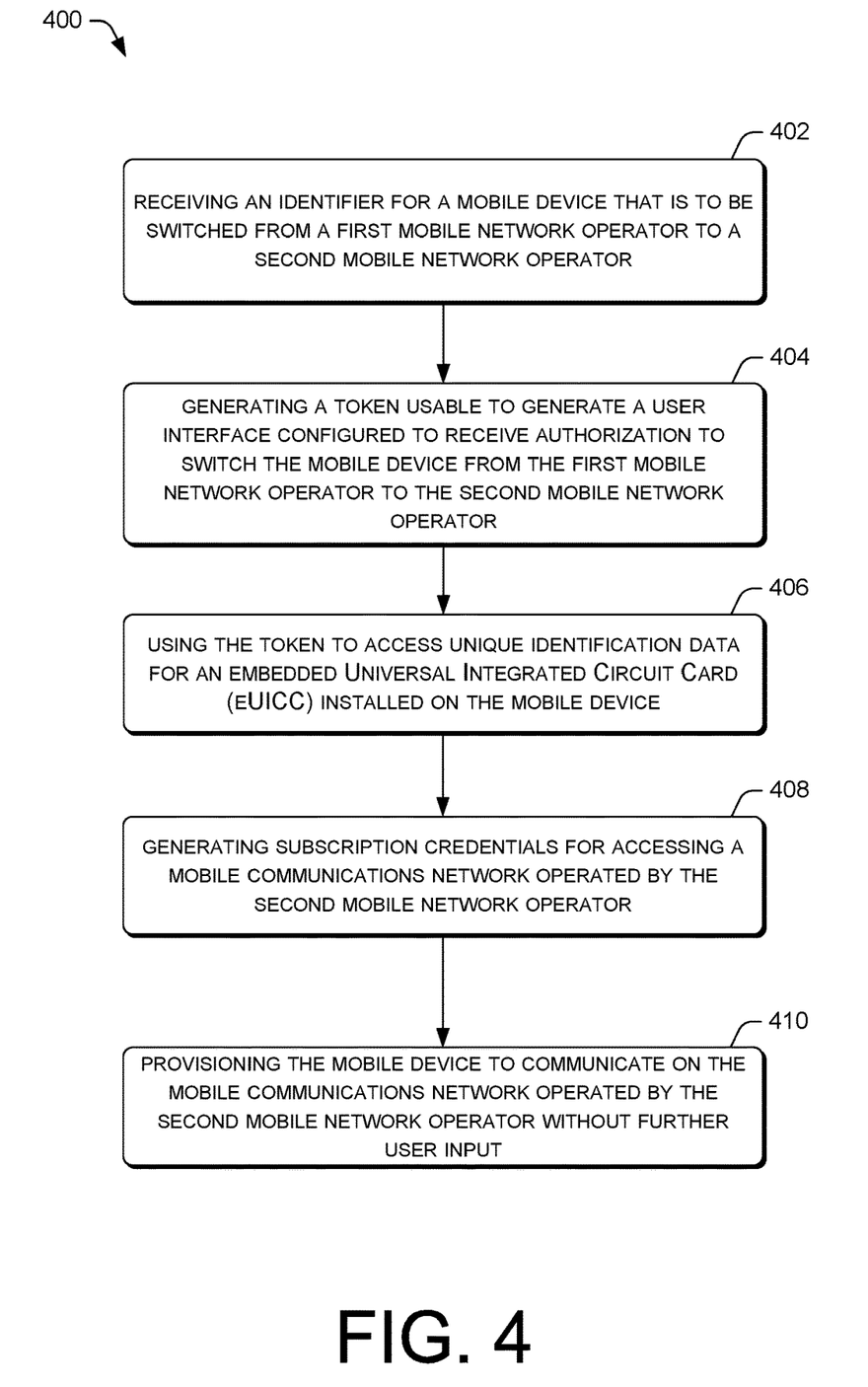
FIG. 4 is a flow diagram of an example process for switching carriers.
Figure 5:
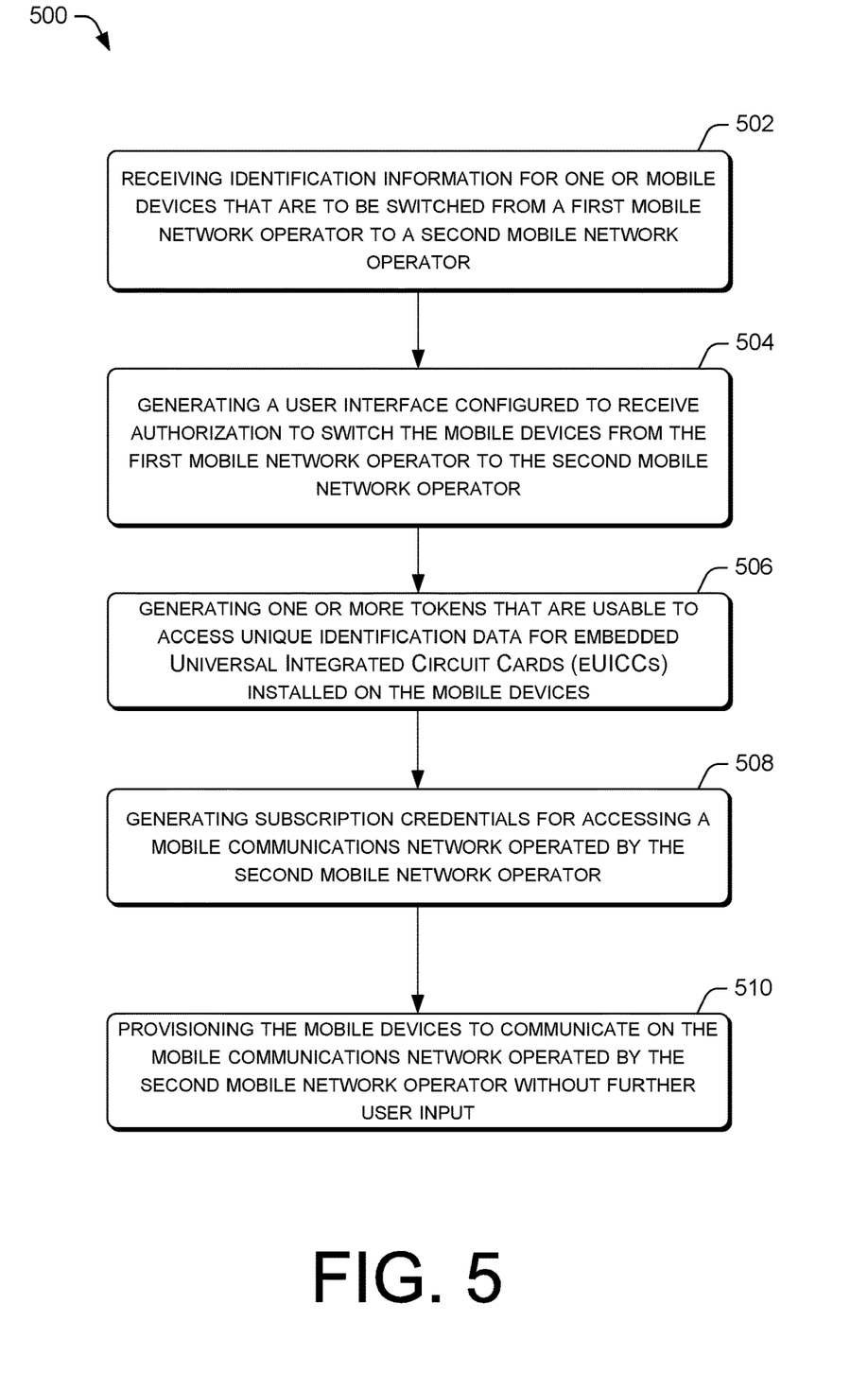
FIG. 5 is a flow diagram of an example process for switching carriers.

FIGS. 4-5 present illustrative processes 400-500 to change carriers associated with a device. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-500 may be described with reference to the architecture 100 of FIG. 1.

FIG. 4 is a flow diagram of an example process 400 for switching carriers.

At block 402, an identifier is received for a mobile device that is to be switched from a first mobile network operator to a second mobile network operator.

At block 404, a token is generated that is usable to generate, on the mobile device, a user interface configured to receive authorization to switch the mobile device from the first mobile network operator to the second mobile network operator.

At block 406, in response to receiving the authorization, using the token to access unique identification data for an embedded Universal Integrated Circuit Card (eUICC) installed on the mobile device.

At block 408, subscription credentials are generated for accessing a mobile communications network operated by the second mobile network operator, the subscription credentials generated based in part on the token.

At block 410, using the subscription credentials, the mobile device is provisioned to communicate on the mobile communications network operated by the second mobile network operator without further user input.

In an embodiment, the user interface may be generated by an application executing on the mobile device. The application may be configured to facilitate switching the mobile device between mobile network operators. In some embodiments, data may be accessed, including data comprising one or more of a subscriber name, service address, usage history, or call history for the mobile device. The data may be accessed in response to receiving an authorization to access the data via the user interface. In an embodiment, the accessed data may be analyzed to predict a subscription profile based on the usage history or call history.

In an embodiment, data comprising one or more of a geographic location of the mobile device, credit history of an owner of the mobile device, an ownership status of the mobile device, or a purchase history of the mobile device may be accessed. In some embodiments, the accessed data may be analyzed to determine whether to proceed with switching the mobile device between the mobile network operators.

In an embodiment, the unique identification data may be one of a MSISDN, IMEI, or EID. Additionally, the token may include a location of a SM-DP+.

In some embodiments, a second identifier for a second mobile device that is to be switched from the first mobile network operator to the second mobile network operator may be received. A second token may be generated that is usable to generate, on the second mobile device, a user interface configured to receive authorization to switch the second mobile device from the first mobile network operator to the second mobile network operator. In response to receiving the authorization, the second token may be used to access unique identification data for an embedded Universal Integrated Circuit Card (eUICC) installed on the second mobile device. Subscription credentials may be generated for the second mobile device to access the mobile communications network operated by the second mobile network operator. In an embodiment, the subscription credentials may be generated based in part on the second token. Using the subscription credentials for the second mobile device, the second mobile device may be provisioned to communicate on the mobile communications network operated by the second mobile network operator without further user input.

In an embodiment, a subscription management service may be executed on one or more computing devices, and generating the token may include calling an application program interface (API) of the subscription management service to send a profile change request to the subscription management service FIG. 5 is a flow diagram of an example process 500 for switching carriers.

At block 502, identification information is received for one or mobile devices that are to be switched from a first mobile network operator to a second mobile network operator.

At block 504, a user interface is generated that is configured to receive authorization to switch the mobile devices from the first mobile network operator to the second mobile network operator.

At block 506, in response to receiving the authorization, one or more tokens are generated that are usable to access unique identification data for embedded Universal Integrated Circuit Cards (eUICCs) installed on the mobile devices.

At block 508, subscription credentials are generated for accessing a mobile communications network operated by the second mobile network operator, the subscription credentials generated based in part on the tokens.

At block 510, using the subscription credentials, the mobile devices are provisioned to communicate on the mobile communications network operated by the second mobile network operator without further user input.

In an embodiment, the one or mobile devices may be part of a group plan and the mobile devices may be each associated with different users. In some embodiments, the one or mobile devices may be switched from the first mobile network operator to the second mobile network operator on a time-limited basis.

In some embodiments, a demographic profile may be determined based on the geographic location of the mobile device. Based on the demographic profile, it may be determined whether to proceed with switching the mobile device between the mobile network operators.

The embodiments may provide a wireless communication carrier to seamlessly switch a user's mobile device using data from a prospective device's eSIM. This is traditionally a time-intensive and laborious process that can be a barrier for wireless communication carriers to acquire new users who wish to switch from their current carrier to the wireless communication carrier. This seamless process avoids the user from manually entering information on a multiple page form and spending hours attempting to facilitate the process with representatives from the carrier.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method of provisioning a mobile device configured to communicate on a mobile communications network, the method comprising:
   receiving an identifier for a mobile device that is to be switched from a first mobile network operator to a second mobile network operator;
   sending a token to the mobile device that causes the mobile device to generate a user interface that prompts an input of an authorization to switch the mobile device from the first mobile network operator to the second mobile network operator via the user interface;
   in response to receiving the authorization as inputted via the user interface of the mobile device, using the token to access unique identification data for an embedded Universal Integrated Circuit Card (eUICC) installed on the mobile device;
   generating subscription credentials for accessing a mobile communications network operated by the second mobile network operator, the subscription credentials generated based in part on the token; and
   using the subscription credentials, provisioning the mobile device to communicate on the mobile communications network operated by the second mobile network operator without further user input.

2. The method of claim 1, wherein the user interface is generated by an application executing on the mobile device, the application configured to facilitate switching the mobile device between mobile network operators.

3. The method of claim 1, further comprising accessing data comprising one or more of a subscriber name, service address, usage history, or call history for the mobile device, wherein the data is accessed in response to receiving an authorization to access the data via the user interface.

4. The method of claim 3, further comprising analyzing the accessed data to predict a subscription profile based on the usage history or call history.

5. The method of claim 1, further comprising accessing data comprising one or more of a geographic location of the mobile device, credit history of an owner of the mobile device, an ownership status of the mobile device, or a purchase history of the mobile device.

6. The method of claim 5, further comprising analyzing the accessed data to determine whether to proceed with switching the mobile device between the first and second mobile network operators.

7. The method of claim 1, wherein the unique identification data is one of a Mobile Station International Subscriber Directory Number (MSISDN), International Mobile Equipment Identity (IMEI), or an eUICC ID (EID).

8. The method of claim 1, wherein the token includes a location of a Subscription Manager Data Preparation Plus (SM-DP+).

9. The method of claim 1, further comprising:
receiving a second identifier for a second mobile device that is to be switched from the first mobile network operator to the second mobile network operator;
generating a second token that is usable to generate, on the second mobile device, a user interface configured to receive authorization to switch the second mobile device from the first mobile network operator to the second mobile network operator;
in response to receiving the authorization, using the second token to access unique identification data for an embedded Universal Integrated Circuit Card (eUICC) installed on the second mobile device;
generating subscription credentials for the second mobile device to access the mobile communications network operated by the second mobile network operator, the subscription credentials generated based in part on the second token; and
using the subscription credentials for the second mobile device, provisioning the second mobile device to communicate on the mobile communications network operated by the second mobile network operator without further user input.

10. The method of claim 1, further comprising executing a subscription management service on one or more computing devices, and wherein the generating the token includes calling an application program interface (API) of the subscription management service to send a profile change request to the subscription management service.

11. One or more non-transitory computer-readable media storing computer-executable instructions that, upon execution cause one or more processors of a computing device to cause the computing device to perform operations comprising:
receiving identification information for one or more mobile devices that are to be switched from a first mobile network operator to a second mobile network operator;
receiving an authorization, as inputted via a user interface executing on a mobile device of the one or more mobile devices, to switch the one or more mobile devices from the first mobile network operator to the second mobile network operator;
sending each corresponding token of one or more tokens to a corresponding mobile device of the one or more mobile devices to cause the corresponding mobile device to generate a user interface that prompts an input of an authorization to switch the corresponding mobile device from the first mobile network operator to the second mobile network operator via the user interface;
receiving one or more authorizations, as inputted via one or more user interfaces executing on the one or more mobile devices, to switch the one or more mobile devices from the first mobile network operator to the second mobile network operator;
in response to receiving the one or more authorizations, using the one or more tokens to access unique identification data for embedded Universal Integrated Circuit Cards (eUICCs) installed on the one or more mobile devices;
generating one or more corresponding subscription credentials for accessing a mobile communications network operated by the second mobile network operator, the one or more corresponding subscription credentials generated based in part on the one or more corresponding tokens; and
using the one or more corresponding subscription credentials, provisioning the one or more mobile devices to communicate on the mobile communications network operated by the second mobile network operator without further user input.

12. The one or more non-transitory computer-readable media of claim 11, wherein the one or more mobile devices are part of a group plan.

13. The one or more non-transitory computer-readable media of claim 11, wherein the one or more mobile devices are to be switched from the first mobile network operator to the second mobile network operator on a time-limited basis.

14. The one or more non-transitory computer-readable media of claim 11, further comprising instructions for accessing data comprising one or more of a geographic location of the mobile device, credit history of an owner of the mobile device, an ownership status of the mobile device, or a purchase history of the mobile device.

15. The one or more non-transitory computer-readable media of claim 14, further comprising instructions for:
determining a demographic profile based on the geographic location of the mobile device; and
based on the demographic profile, determining whether to proceed with switching the mobile device between the first and second mobile network operators.

16. A system comprising:
one or more processors; and
memory including a plurality of computer-executable components that are executable by the one or more processors to perform a plurality of actions, the plurality of actions comprising:
receiving identification information for a mobile device to be switched from a first mobile network operator to a second mobile network operator;
sending a token to the mobile device that causes the mobile device to generate a user interface that prompts an input of an authorization to switch the mobile device from the first mobile network operator to the second mobile network operator via the user interface;
receiving, from the user interface executing on the mobile device, authorization to switch the mobile device from the first mobile network operator to the second mobile network operator;
in response to receiving the authorization as inputted via the user interface executing on the mobile device, using the token to access unique identification data for an embedded Universal Integrated Circuit Card (eUICC) installed on the mobile device;
generating subscription credentials for accessing a mobile communications network operated by the second mobile network operator, the subscription credentials generated based in part on the tokens; and
using the subscription credentials, provisioning the mobile device to communicate on the mobile communications network operated by the second mobile network operator without further user input.

17. The system of claim 16, further comprising computer-executable components that are executable by the one or more processors to perform a plurality of actions, the plurality of actions comprising:
receiving a second identifier for a second mobile device that is to be switched from the first mobile network operator to the second mobile network operator;

receiving, from a user interface executing on the second mobile device, authorization to switch the second mobile device from the first mobile network operator to the second mobile network operator;

in response to receiving the authorization to switch the second mobile device, generating one or more tokens that are usable to access unique identification data for an embedded Universal Integrated Circuit Card (eUICC) installed on the second mobile device;

generating subscription credentials for the second mobile device to access the mobile communications network operated by the second mobile network operator, the subscription credentials generated based in part on the tokens for the second mobile device; and using the subscription credentials for the second mobile device, provisioning the second mobile device to communicate on the mobile communications network operated by the second mobile network operator without further user input.

18. The system of claim 16, further comprising computer-executable components that are executable by the one or more processors to perform actions comprising:

accessing data comprising one or more of a subscriber name, service address, usage history, or call history for the mobile device, wherein the data is accessed in response to receiving an authorization to access the data via the user interface.

19. The system of claim 18, further comprising computer-executable components that are executable by the one or more processors to perform actions comprising:

analyzing the accessed data to predict a subscription profile based on the usage history or call history.

20. The system of claim 16, further comprising computer-executable components that are executable by the one or more processors to perform actions comprising:

executing a subscription management service, wherein the generating the token includes calling an application program interface (API) of the subscription management service to send a profile change request to the subscription management service.

\* \* \* \* \*